US009991716B2

United States Patent

Cutright et al.

(10) Patent No.: US 9,991,716 B2

(45) Date of Patent: Jun. 5, 2018

(54) DELIVERY OF MULTIPLE GRID SERVICES WITH ENERGY STORAGE SYSTEM

(71) Applicant: General Electric Company, Schenectady, NY (US)

(72) Inventors: Richard Hayes Cutright, Corinth, NY (US); Robert August Kaucic, Niskayuna, NY (US); Joshua Paul Webb, Schenectady, NY (US); Patrick Osae Djan-Sampson, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 556 days.

(21) Appl. No.: 14/632,213

(22) Filed: Feb. 26, 2015

(65) Prior Publication Data

US 2016/0254671 A1 Sep. 1, 2016

(51) Int. Cl.

| | |
|---|---|
| ***H02J 7/00*** | (2006.01) |
| ***H02J 3/38*** | (2006.01) |
| ***G05B 19/048*** | (2006.01) |
| ***H02J 3/32*** | (2006.01) |
| *H02J 13/00* | (2006.01) |

(52) U.S. Cl.

CPC ............ *H02J 3/383* (2013.01); *G05B 19/048* (2013.01); *H02J 3/32* (2013.01); *H02J 3/386* (2013.01); *H02J 7/0068* (2013.01); *G05B 2219/2639* (2013.01); *H02J 13/00* (2013.01)

(58) Field of Classification Search

None

See application file for complete search history.

(56) References Cited

U.S. PATENT DOCUMENTS

2016/0190822 A1* 6/2016 Lee .......................... H02J 3/32 307/24

FOREIGN PATENT DOCUMENTS

EP 2 688 173 A1 1/2014

* cited by examiner

*Primary Examiner* — Paul Yanchus, III

(74) *Attorney, Agent, or Firm* — Dority & Manning, P.A.

(57) ABSTRACT

Systems and methods for controlling an energy storage system to provide for delivery of multiple grid services are provided. Grid service requests can be categorized into a plurality of priority tiers. Power demands associated with the grid service requests can be allocated to enforce the prioritization scheme of the priority tiers. For instance, power demands associated with grid service requests in higher priority tiers can be given preference over power demands associated with grid service requests in lower priority tiers. Multiple grid service requests can be categorized within the same priority tier. In addition, the energy storage system can be controlled not only give priority to grid services requests categorized in the higher priority tiers, but also to manage the state of charge of the system to ensure that there is sufficient reserve capacity to meet power demands of the grid service requests categorized in the higher priority tiers.

19 Claims, 6 Drawing Sheets

410 412 312 415 450 350 414 420 445 314 422 425 + + 424 440 322 316 432 + + 434 435 324 430

100

110
115
120
125
130
140
150
200
112
DC/DC
AC/DC
CONTROLLER
B E S S
B M S

DELIVERY OF MULTIPLE GRID SERVICES WITH ENERGY STORAGE SYSTEM

FIELD OF THE INVENTION

The present subject matter relates generally to energy storage systems and more particularly, to delivery of multiple grid services with energy storage systems.

BACKGROUND OF THE INVENTION

Power generation facilities can be configured to deliver various grid services for revenue generation. For instance, power generations systems, such as renewable energy plants, can be configured to respond to power demands for grid services, such as peak shaving, frequency response, ramp rate control, purchasing and selling of energy, load following, energy arbitration, and other grid services. Typically, power generation facilities provide grid services in modal fashion such that the power generation facility responds to power demands for a single grid service at a time.

Energy storage systems have become increasingly used to deliver power to utility grids either as part of standalone energy storage systems or as part of a renewable energy farm (e.g. a wind farm or solar farm) with an integrated energy storage system. Energy storage systems can include one or more battery banks or other energy storage devices that can be coupled to the grid via a suitable power converter. Energy storage systems are unique in that energy storage systems have the ability to both deliver and reserve energy for particular grid services.

BRIEF DESCRIPTION OF THE INVENTION

Aspects and advantages of embodiments of the present disclosure will be set forth in part in the following description, or may be learned from the description, or may be learned through practice of the embodiments.

One example aspect of the present disclosure is directed to a method of controlling the delivery of a plurality of grid services with an energy storage system. The method includes accessing, by one or more control devices, data indicative of a plurality of grid service requests for an energy storage system. The plurality of grid service requests are categorized into a plurality of priority tiers. The method further includes determining, by one or more control devices, an aggregated power demand for each of the plurality of priority tiers and determining, by the one or more control devices, data indicative of a state of charge reserve for one or more of the plurality of priority tiers. The method further includes controlling, by the one or more control devices, power delivery of the energy storage system based at least in part on the aggregated power demand for each of the plurality of priority tiers and the data indicative of the state of charge reserve for one or more of the priority tiers such that one or more grid service requests in a higher priority tier are given preference over one or more grid service requests in a lower priority tier.

Another example aspect of the present disclosure is directed to a control system for controlling an energy storage system. The control system includes a service categorization module implemented by one or more control devices. The service categorization module is configured to categorize a plurality of grid service requests into a plurality of priority tiers. The service categorization module is further configured to determine data indicative of an aggregated power demand for each of the priority tiers. The control system further includes a state of charge management module implemented by the one or more control devices. The state of charge management module is configured to determine data indicative of a state of charge reserve for one or more of the plurality of priority tiers based at least in part on a state of charge of the energy storage system. The control system can further include a service aggregation module implemented by the one or more control devices. The service categorization module is configured to determine a power delivery command based at least in part on the data indicative of the aggregated power demand for each of the one or more priority tiers and the data indicative of the state of charge reserve for one or more of the plurality of priority tiers.

Another example aspect of the present disclosure is directed to an energy storage system. The energy storage system includes a plurality of energy storage devices configured to deliver power to a utility grid and an interface for receiving a plurality of grid service requests. The system further includes a monitoring device configured to monitor a state of charge of the plurality of energy storage devices and a control system configured to categorize the plurality of grid service requests into a plurality of priority tiers. The control system is further configured to determine an aggregated power demand for each of the plurality of priority tiers and to determine a state of charge reserve for one or more of the plurality of priority tiers based on the state of charge. The control system is further configured to control power delivery of the energy storage system based at least in part on the aggregated power demand for each of the priority tiers and the state of charge reserve for one or more of the plurality of priority tiers such that such that one or more grid service requests in a higher priority tier are given preference over one or more grid service requests in a lower priority tier.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Figure 1:
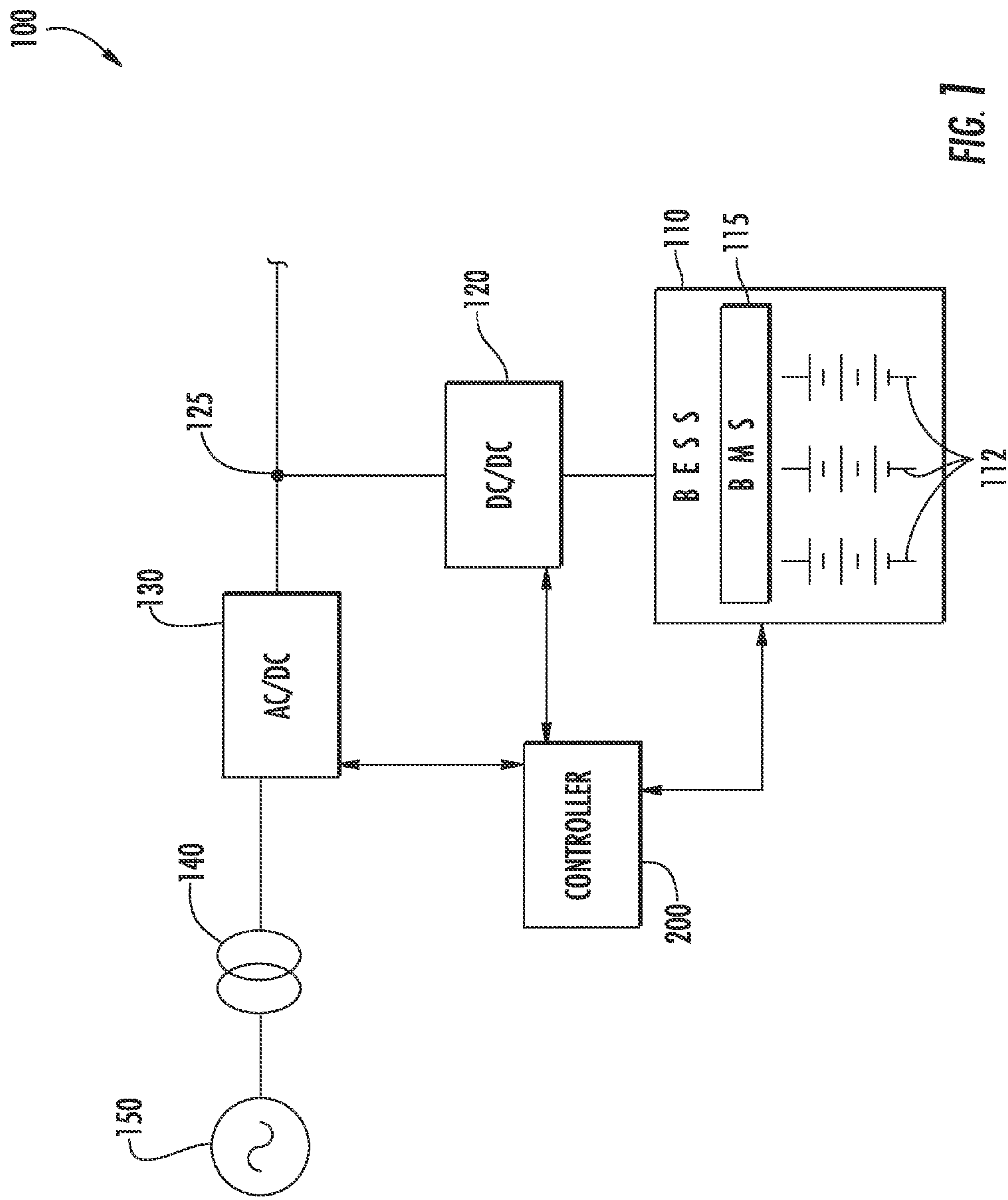
FIG. 1 depicts an example energy storage system according to example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to systems and methods for providing multiple grid services with an energy storage system. More particularly, a control system associated with an energy storage system can control power delivery by the energy storage system to simultaneously deliver multiple grid services. The control system can be configured to prioritize, categorize, and aggregate the respective power demands of the grid services to ensure availability of energy to meet power demands of the services and to ensure that the aggregated state of charge of the energy storage system is controlled effectively to meet grid service delivery.

More particularly, an energy storage system can receive grid service requests to provide power for various grid services, such as peak shaving, frequency response, ramp rate control, purchasing and selling of energy, load following, energy arbitration, state of charge management, and other grid services. Each grid service request can be associated with a power demand from the energy storage system. To meet the power demand of a particular grid service, the energy storage system can be controlled to either discharge power from energy storage devices or to absorb power (e.g. to charge) at the energy storage devices.

According to particular aspects of the present disclosure, the grid service requests can be prioritized into a plurality of priority tiers, such as a three-tiered structure including a primary priority tier, a secondary priority tier, and a tertiary priority tier. The tier assignment of a grid service request can dictate the priority of the grid service request in relation to other services being delivered by the energy storage system. For instance, grid service requests categorized in a higher priority tier (e.g. the primary tier) can be assigned the highest priority and can be delivered at all instances within the constraints of the energy storage system and without compromise from the grid service requests categorized in the lower priority tiers, such as the secondary tier and the tertiary tier. Grid service requests in the secondary tier can have the next highest priority followed by grid service requests in the tertiary tier, and so forth. Multiple grid service requests can be assigned within a common priority tier based on the needs of the operator of the energy storage system.

Power demands associated with the grid service requests in different priority tiers can be allocated in a fashion to enforce the prioritization scheme of the tiered architecture. More particularly, power demands associated with grid service requests in the highest priority tier can be delivered without any compromise in power delivery while trying to deliver power demands associated with grid service requests in lower priority tiers. This can be accomplished by determining an aggregate power demand for each priority tier, for instance, by summing power demands for all grid services requests categorized in the priority tier. Aggregated power demands for lower priority tiers are only delivered when it is determined that there is available capacity in the energy storage system after aggregated power demands for higher priority tiers have been allocated or delivered. The grid service requests in the lower priority tiers are curtailed first when the grid service requests are being constrained by available capacity of the energy storage system.

In some embodiments, the energy storage system controller can not only give priority to grid services requests categorized in the higher priority tiers, but also can manage the state of charge of the energy storage system to ensure that there is sufficient reserve capacity to meet power demands of the grid service requests categorized in the higher priority tiers. More particularly, the state of charge of the energy storage system can be controlled to reserve energy for delivery of the grid service requests in the higher priority tiers as well as to create capacity to absorb energy based on the requirements of the grid service requests.

In particular implementations, the power delivery of the energy storage system can be controlled such that grid service requests in the higher priority tiers are not degraded by the grid service requests in the lower priority tiers. More particularly, any lower priority service power request with a different polarity from the polarity of the primary tiered service can be completely ignored. The polarity of grid service request refers to whether the power demand associated with the grid service request requires charging or discharging of the energy storage system. As an example, if a primary tiered service needs to discharge the energy storage system in to meet a grid service request and a lower tiered service needs to charge the energy storage system at the same time, the lower tiered charge request is ignored to prevent the primary tiered service from being degraded once the power demands are aggregated.

With reference now to the Figures, example embodiments of the present disclosure will now be discussed in detail. FIG. 1 depicts an example power system 100 that includes an energy storage system 110 according to example aspects of the present disclosure. The power system 100 can be a standalone power generation system or can be implemented as part of a renewable energy system, such as wind farm or solar farm.

The power system 100 can include a battery energy storage system (BESS) 110. The BESS 110 can include one or more battery energy storage devices 112, such battery cells or battery packs. The battery energy storage devices 112 can contain one or more sodium nickel chloride batteries, sodium sulfur batteries, lithium ion batteries, nickel metal hydride batteries, or other similar devices. The present disclosure is discussed with reference to a battery energy storage system for purposes of illustration and discussion, those of ordinary skill in the art, using the disclosures provided herein, should understand that other energy storage devices (e.g. capacitors, fuel cells, etc.) can be used without deviating from the scope of the present disclosure.

The BESS 110 can include a battery management system (BMS) 115. The BMS 115 can include one or more electronic devices that monitor one or more of the battery energy storage devices 112, such as by protecting the battery energy storage device from operating outside a safe operating mode, monitoring a state of the battery energy storage device, calculating and reporting operating data for the battery energy storage device, controlling the battery energy storage device environment, and/or any other suitable control actions. For example, in several embodiments, the BMS 115 is configured to monitor and/or control operation of one or more energy storage devices 112. The BMS 115 can be, for example, a logic controller implemented purely in hardware, a firmware-programmable digital signal processor, or a programmable processor-based software-controlled computer.

The BESS 110 can be coupled to a DC to DC converter 120. The DC to DC converter 120 can be a buck converter, boost converter, or buck/boost converter. The DC to DC converter 120 can convert a DC voltage at the DC bus 125 to a suitable DC voltage for providing power to or receiving power from the BESS 110. The DC bus 125 can be a standalone DC bus between the DC to DC converter 120 and the inverter 130. Alternatively, the DC bus 125 can be a DC bus of a two-stage power converter used to convert energy from a renewable energy source to suitable power for the AC grid 150.

The DC to DC converter can include one or more electronic switching elements, such as insulated gate bipolar transistors (IGBT). The electronic switching elements can be controlled (e.g. using pulse width modulation) to charge or to discharge the battery energy storage system 110. In addition, the electronic switching elements can be controlled to condition DC power received or provided to the BESS 115.

The power system can further include and inverter 130. The inverter 130 can be configured to convert DC power on the DC bus 125 to suitable AC power for application to utility grid 150 (e.g. 50 Hz or 60 Hz AC power). The inverter 130 can include one or more electronic switching elements, such as IGBTs. The electronic switching elements can be controlled (e.g. using pulse width modulation) to convert the DC power on the DC bus to suitable AC power for the grid 150. The inverter 130 can provide AC power to the grid 150 through a suitable transformer 140 and various other devices, such as switches, relays, contactors, etc. used for protection of the power system 100.

Figure 2:
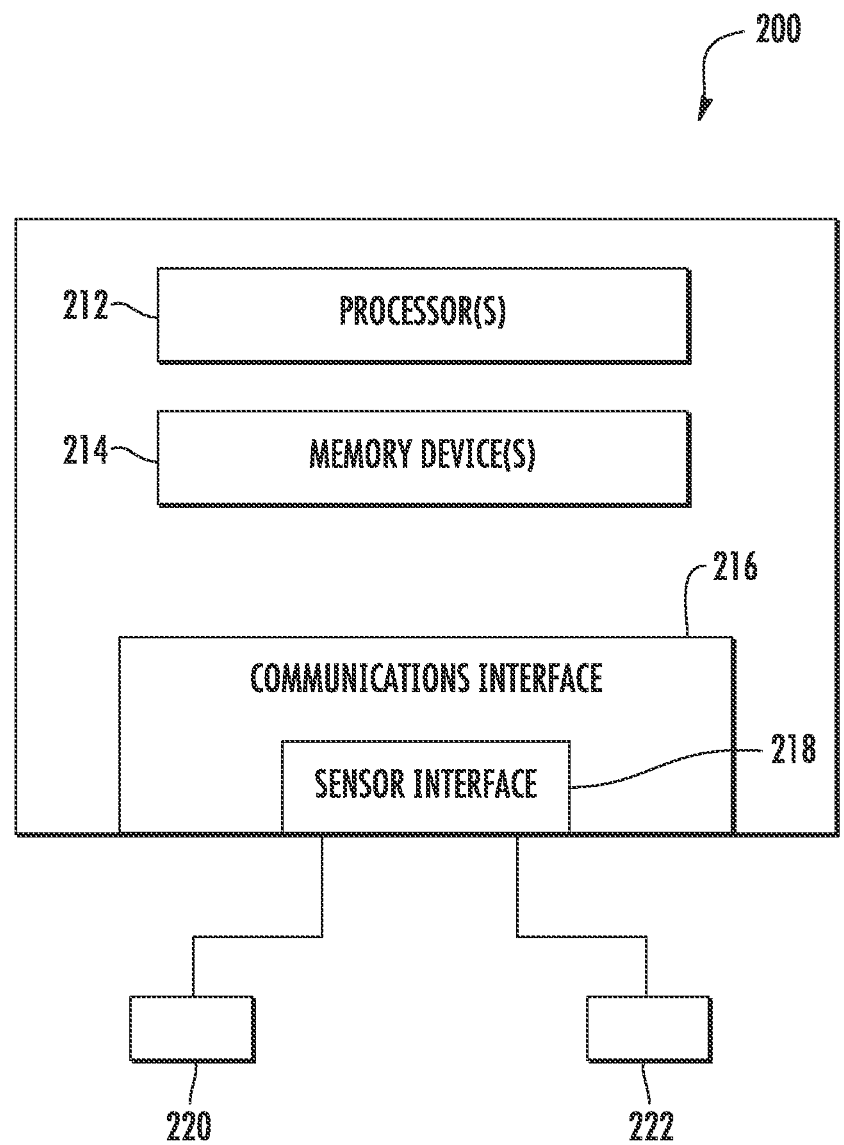
FIG. 2 depicts aspects of an example controller according to example embodiments of the present disclosure.

The power system 100 can also include a controller 200 that is configured to monitor and/or control various aspects of the power system 100 as shown in FIGS. 1 and 2. For example, the controller 200 can be configured to control the energy storage system to simultaneously deliver multiple grid services according to example aspects of the present disclosure discussed herein. In accordance with various embodiments, the controller 190 can be a separate unit (as shown) or can be part of the BMS 115 of the BESS 110.

Referring particularly to FIG. 2, the controller 200 can have any number of suitable control devices. The controller 200 can be a farm level controller or a controller of one or more individual BESS 110. As shown, for example, the controller 200 can include one or more processor(s) 212 and one or more memory device(s) 214 configured to perform a variety of computer-implemented functions and/or instructions (e.g., performing the methods, steps, calculations and the like and storing relevant data as disclosed herein). The instructions when executed by the processor(s) 212 can cause the processor(s) 212 to perform operations according to example aspects of the present disclosure. For instance, the instructions when executed by the processor(s) 212 can cause the processor(s) 212 to implement one or more control modules, such as a service categorization module, state of charge management module, and service aggregation module as will be discussed in more detail below.

Additionally, the controller 200 can include a communications module 216 to facilitate communications between the controller 200 and the various components of the system 100. Further, the communications module 216 can include a sensor interface 218 (e.g., one or more analog-to-digital converters) to permit signals transmitted from one or more sensors 220, 222 to be converted into signals that can be understood and processed by the processors 212. It should be appreciated that the sensors (e.g. sensors 220, 222) can be communicatively coupled to the communications module 218 using any suitable means, such as a wired or wireless connection. The signals can be communicated using any suitable communications protocol.

As such, the processor(s) 212 can be configured to receive one or more signals from the sensors 220 and 222. For instance, the processor(s) 212 can receive signals indicative of the state of charge of the energy storage system from sensor 220, such as a monitoring device configured to monitor a state of charge of the energy storage devices in the energy storage system. The processor(s) 212 can receive signals indicative of power delivery (e.g. amount of power charging/discharging) from sensor 222.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 212 can generally include memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD) and/or other suitable memory elements. Such memory device(s) 214 can generally be configured to store suitable computer-readable instructions that, when implemented by the processor(s) 212, configure the controller 200 to perform the various functions as described herein.

Figure 3:
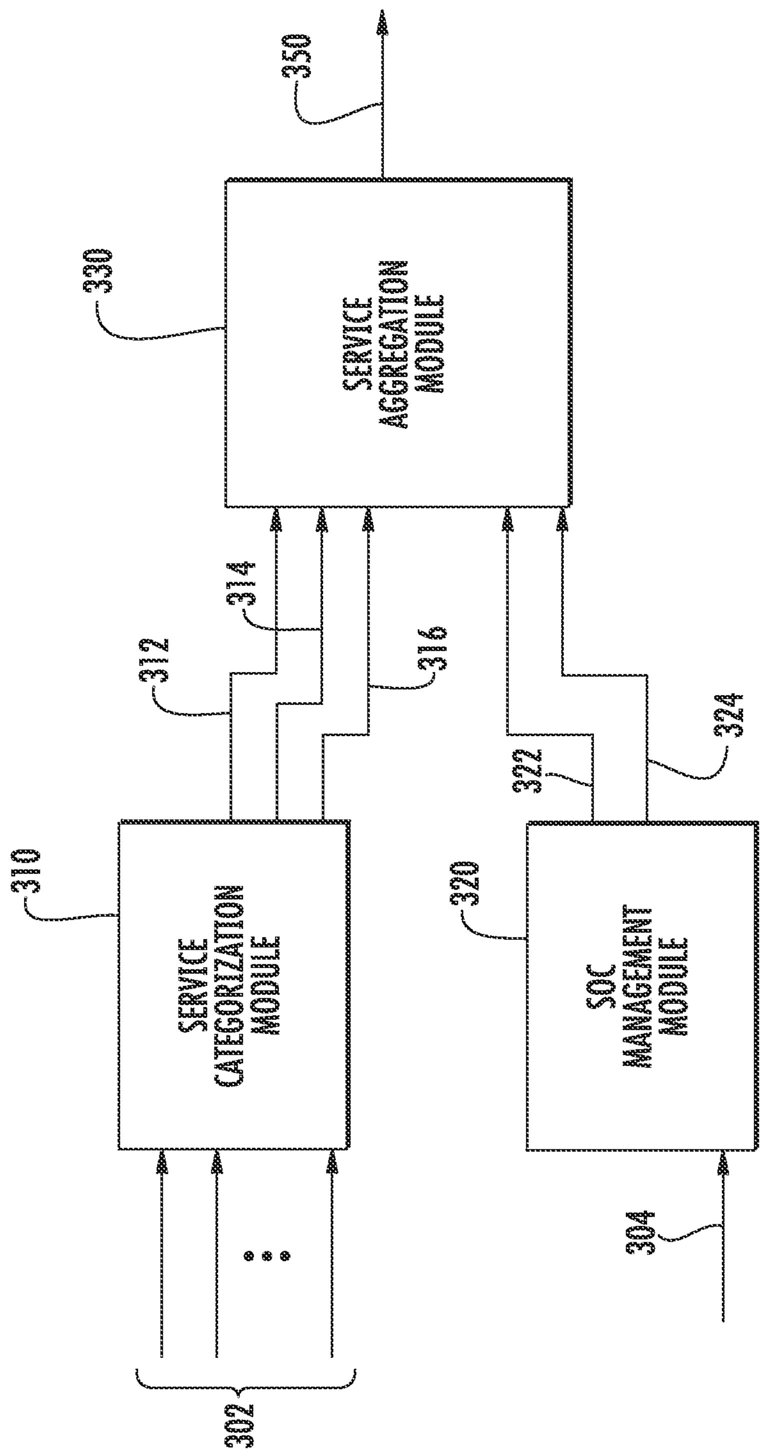
FIG. 3 depicts an example control topology for an example control system according to example embodiments of the present disclosure.

FIG. 3 depicts an example control topology that can be implemented by controller 200 and/or other control device to control the power system 100 to simultaneously deliver multiple grid services according to example aspects of the present disclosure. The control topology includes a service categorization module 310, a state of charge (SOC) management module 320, and a service categorization module 330.

The service categorization module 310 can be configured to receive signals 302 indicative of a plurality of grid service requests via a suitable interface (e.g. an interface for communicating with the controller 200). Each of the signals 302 can be associated with a different grid service request. Each grid service request can be associated with a power demand for the energy storage system for delivering one of various grid services, such as peak shaving, peak shaving, frequency response, ramp rate control, purchasing and selling of energy, load following, energy arbitration, and other grid services. The power demand for a grid service can include required discharging power by the energy storage system or charging power by the energy storage system to provide the grid service.

The service categorization module 310 can process the signals 302 to categorize the grid service requests into different priority tiers. For instance, the service categorization module 310 can categorize the grid service requests into a primary tier, a secondary tier, and a tertiary tier with the primary tier having the highest priority, the secondary tier having the next highest priority, and the tertiary tier having the lowest priority. More or fewer priority tiers can be used without deviating from the scope of the present disclosure. More than one grid service request can be categorized into a priority tier. For instance, in example implementations, at least two grid service requests are categorized into a common priority tier, such as the primary tier. The grid services request can be categorized based on system operator preferences. For instance, a system operator can categorize grid services into priority tiers as desired. In addition, the system operator can change the priority tier associated with a particular grid service as different needs of the system arise.

The service categorization module 310 can determine an aggregate power demand for each of the priority tiers. The aggregate power demand for a priority tier can be representative of the total power demand for all grid service requests categorized in each priority tier. In examples wherein a single grid service request is categorized in a priority tier, the aggregate power demand for the priority tier can be equal to the power demand associated with the single grid service request. In examples where multiple grid service requests are categorized in a priority tier, the aggregate power demand for the priority tier can be determined by summing the power demands associated with each grid service request in the priority tier.

The service categorization module 310 can provide signals indicative of the aggregated power demand to a service aggregation module 330. More particularly, the service categorization module 310 can provide a first signal 312 indicative of the aggregated power demand for the primary tier, a second signal 314 indicative of the aggregated power demand for the secondary tier, and a third signal 316 indicative of the aggregated power demand for the tertiary tier.

The service categorization module 310 can process the signals 312, 314, and 316 according to example aspects of the present disclosure to determine a power delivery command 350. The power delivery command 350 can be used by the controller to control the power delivery of the energy storage system to simultaneously provide multiple grid services such that one or more grid service requests in a higher priority tier (e.g. the primary tier) are given preference over one or more grid service requests in a lower priority tier (e.g. the secondary tier).

For instance, in one implementation, the controller can receive a signal indicative of the current state of power delivery of the energy storage system. The controller can compare the signal to the power delivery command 350 to determine an error signal. The error signal can be used to make adjustments to the power delivery (e.g. charging/discharging) of the energy storage system such that the energy storage system delivers or absorbs power in accordance with the power delivery command.

In particular embodiments, the service aggregation module 330 can also receive signals from a state of charge (SOC) management module 320. The SOC management module 320 can be configured to monitor the state of charge of the energy storage system and to generate signals indicative of state of charge reserve needed for delivery of one or more grid service requests in one or more of the priority tiers. The signals indicative of state of charge reserve can be signals indicative of state of charge requirements to reserve capacity for delivery of energy for one or more grid services in a priority tier as well as signals indicative of reserve capacity to absorb energy based on the requirements of one or more grid services in a priority tier.

As illustrated in FIG. 3, the SOC management module 320 can receive a signal 304 indicative of the state of charge of the energy storage system (e.g. signals indicative of the state of charge of one or more energy storage devices). The signal 304 can be processed to generate a first SOC signal 322 indicative of state of charge reserve for the primary tier and a second SOC signal 324 indicative of state of charge reserve for the secondary tier. The first SOC signal 322 and the second SOC signal 324 can be provided to the service aggregation module 330 which can process the SOC signals 322 and 324 along with aggregated power demand signals 312, 314, and 316 to determine the power delivery command 350 for the energy storage system.

More particularly, the SOC management module 320 can configure the controller to actively control the SOC of the energy storage system to configured SOC targets for the priority tiers. More particularly, SOC boundary limits can be determined for each priority tier based on the power demands for each priority tier. A droop curve specifying target charging settings based on the state of charge of the energy storage system can be developed based on the SOC boundary limits for each tier. The signals indicative of state of charge reserve for each priority tier can be determined from the droop curve based at least in part on the state of charge of the energy storage system.

Figure 4:
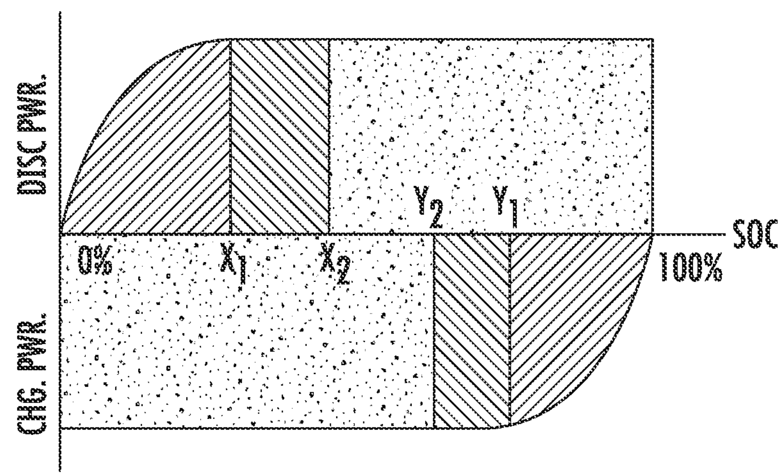
FIG. 4 depicts example state of charge targets to reserve capacity for one or more grid service requests in a priority tier according to example embodiments of the present disclosure.

FIG. 4 depicts example SOC targets to reserve capacity for one or more grid service requests in a priority tier according to example embodiments of the present disclosure. FIG. 4 plots SOC along the horizontal axis and discharge power/charge power along the vertical axis.

Boundary limit x1 can be a discharge boundary limit to reserve power for grid service requests categorized in the primary tier and can be selected based on a projected minimum amount of energy needed for a period to deliver instantaneous dynamic power or contingent power needs to provide the one or more grid service requests in the primary tier. Boundary limit x2 can be a discharge boundary limit to reserve power for grid service requests categorized in the secondary tier and can be selected based on a projected minimum amount of energy needed for a period to deliver instantaneous dynamic power or contingent power needs to provide the one or more grid service requests in the secondary tier.

Boundary limit y1 can be a charge boundary limit to reserve capacity for grid service requests categorized in the primary tier and can be selected based on a minimum amount of capacity that can be used to capture energy for a period to meet the requirements for the one or more grid service requests in the primary tier. Boundary limit y2 can be a charge boundary limit to reserve capacity for grid service requests categorized in the secondary tier and can be selected based on a minimum amount of capacity that can be used to capture energy for a period to meet the requirements for the one or more grid service requests in the primary tier.

Figure 5:
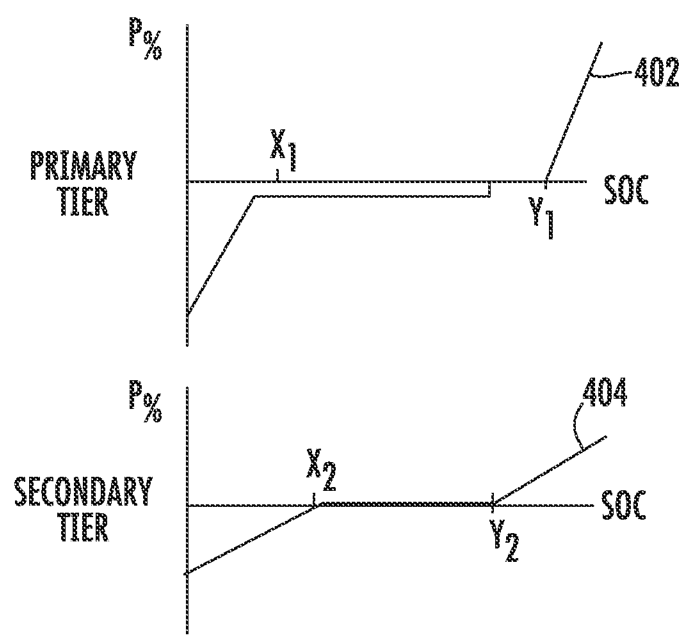
FIG. 5 depicts example droop curves determined for a plurality of priority tiers according to example embodiments of the present disclosure.

FIG. 5 depicts example droop curves determined for a primary tier and a secondary tier according to example aspects of the present disclosure. More particularly, curve 402 plots an example droop curve defined for a primary tier. Curve 404 plots an example droop curve defined for a secondary tier. The droop curves 402 and 404 plot state of charge of the energy storage system along the horizontal axis and charging/discharging power along the vertical axis.

The data indicative of the state of charge reserve for each priority tier can be determined based at least in part on the droop curve for the priority tier and the current state of charge of the energy storage system. More particularly, based on the monitored state of charge of the energy storage system, the amount of power needed for the state of charge reserve for the priority tier is determined by the SOC management module 320 of FIG. 3 from the droop curve for the priority tier. A signal indicative of the state of charge reserve can then be provided from the SOC management module 320 to the service aggregation module 330.

Referring to FIG. 3, the service aggregation module 330 can be configured to generate a power delivery command 350 based at least in part on the signals 312, 314, and 316 indicative of the aggregated power demand for each of the primary tier, the second tier, and the tertiary tier respectively and the signals 322 and 324 indicative of the SOC reserve for the primary tier and the secondary tier respectively. The power delivery command 350 is determined by the service aggregation module 330 to give preference to grid service requests in the primary tier over grid service requests in the secondary tier.

In some implementations, the service aggregation module 330 can be configured to generate a power delivery command 350 that allows simultaneous delivery of multiple grid service requests without degradation of grid service requests in higher priority tiers by grid service requests in lower priority tiers. This can be accomplished, for instance, by determining a polarity of the power delivery command 350 based on a polarity of the aggregate power demand signals 312, 314, and 316 associated with each of the respective priority tiers.

Figure 6:
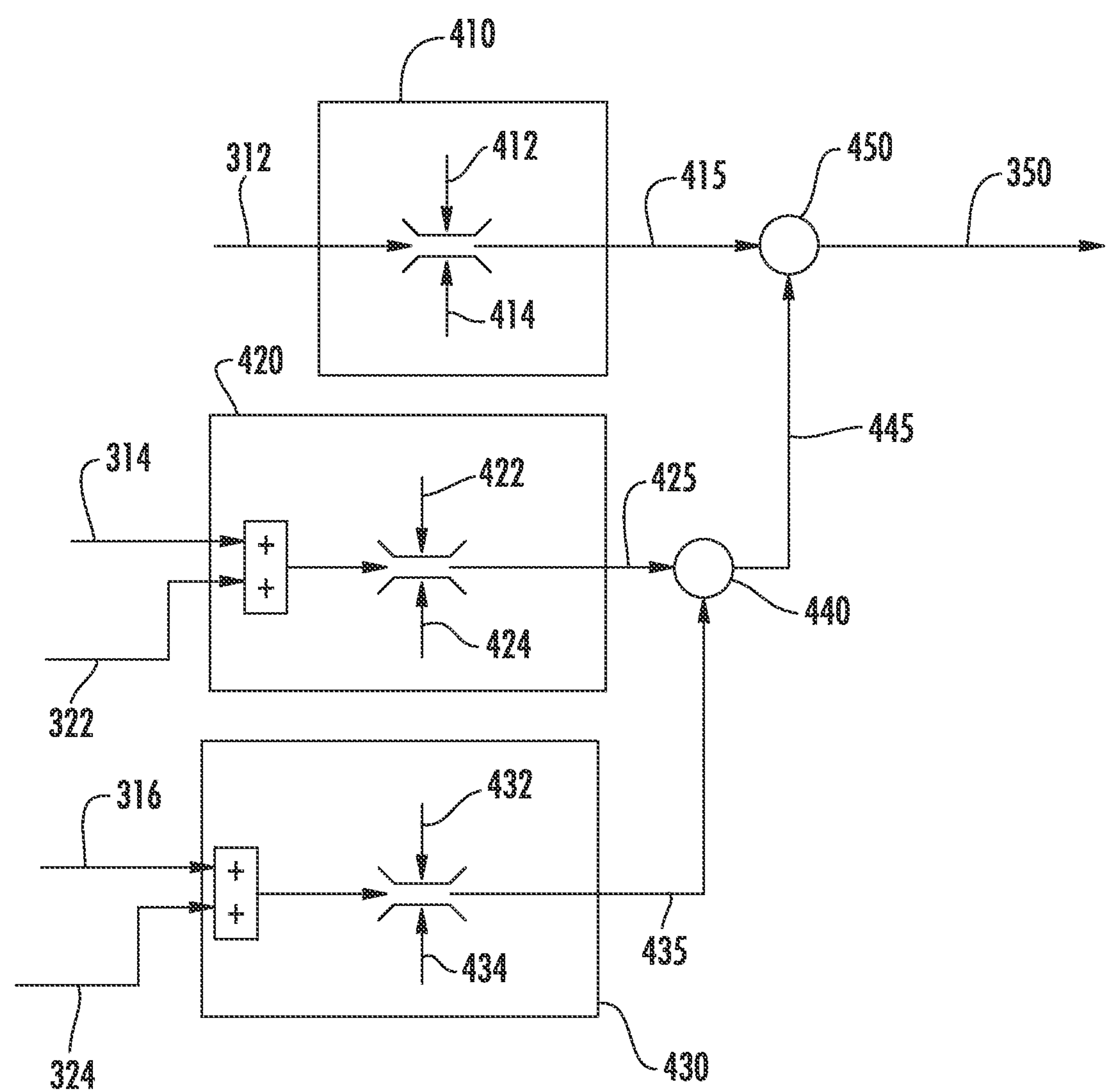
FIG. 6 depicts an example control topology for example grid service aggregation according to example embodiments of the present disclosure.

FIG. 6 depicts an example control topology for the processing of signals 312, 314, 316, 322, and 324 by the service aggregation module 320 to generate a power delivery command 350 according to an example embodiment of the present disclosure. More particularly, signal 312 indicative of the aggregated power demand of the primary tier is received at primary tier stack 410 and is limited based on a signal 412 indicative of the maximum discharge limit of the energy storage system and a signal 414 indicative of the maximum charge limit of the energy storage system to generate a limited aggregated power signal 415 for the primary tier.

Signal 314 indicative of the aggregated power demand of the secondary tier is received at secondary tier stack 412 and is combined with signal 322 indicative of the SOC reserve for the primary tier. The combined signal is limited based on a signal 422 indicative of a maximum available capacity discharge limit after taking into account the aggregated power demand of the primary tier and a signal 424 indicative of a maximum available capacity charge limit after taking into account the aggregated power demand of the primary tier. The limited signal is provided as a limited aggregated power signal 425 for the secondary tier.

Signal 316 indicative of the aggregated power demand of the tertiary tier is received at tertiary tier stack 412 and is combined with signal 324 indicative of the SOC reserve for the secondary tier. The combined signal is limited based on a signal 432 indicative of a maximum available capacity discharge limit after taking into account the aggregated power demand of the primary tier and the secondary tier and a signal 434 indicative of a maximum available capacity charge limit after taking into account the aggregated power demand of the primary tier and the secondary tier. The limited signal is provided as a limited aggregated power signal 435 for the tertiary tier.

The limited aggregated power signal 435 and the limited aggregated power signal 425 are provided to a node 440. At node 440 the signals are combined in accordance with a truth table based at least in part on the polarity of the signals to generate output signal 445. An example truth table implemented at node 440 is provided below:

Node 440 Truth Table

| Signal 425 Polarity | Signal 435 Polarity | Output Signal 445 |
|---|---|---|
| + | + | SUM |
| − | − | SUM |
| + | − | + |
| − | + | − |
| 0 | ± | ± |

"+" is indicative of discharging polarity.
"−" is indicative of charging polarity.
SUM indicates to sum the signals.

The signal 445 and the limited aggregated power signal 415 are provided to node 450. At node 450 the signals are combined in accordance with a truth table based at least in part on the polarity of the signals to generate the power delivery command 350. An example truth table implemented at node 450 is provided below:

Node 450 Truth Table

| Signal 445 Polarity | Signal 415 Polarity | Output Signal 350 |
|---|---|---|
| + | + | SUM |
| − | − | SUM |
| + | − | + |
| − | + | − |
| 0 | ± | ± |

"+" is indicative of discharging polarity.
"−" is indicative of charging polarity.
SUM indicates to sum the signals.

The polarity associated with the power delivery command 350 specifies charging of the energy storage system when the polarity of the higher priority tier specifies charging of the energy storage system and the polarity of the lower priority tiers specifies discharging of the energy storage system. Similarly, the polarity associated with the power delivery command 350 specifies discharging of the energy storage system when the polarity of the higher priority tier specifies discharging of the energy storage system and the polarity of the lower priority tiers specifies charging of the energy storage system.

Figure 7:
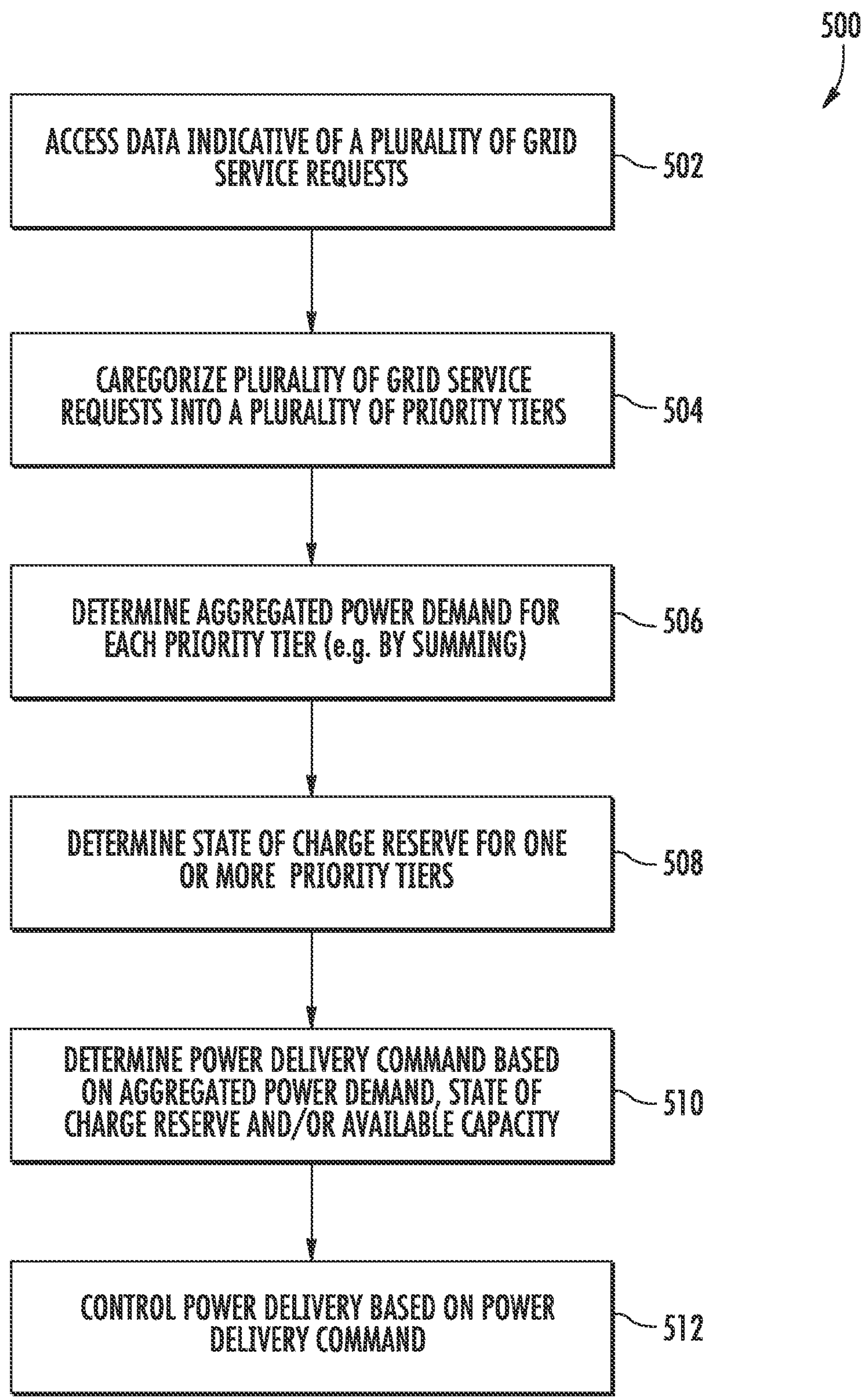
FIG. 7 depicts a flow diagram of an example method for controlling an energy storage system according to example embodiments of the present disclosure.

FIG. 7 depicts a flow diagram of an example method (500) for controlling an energy storage system according to example embodiments of the present disclosure. The method (500) can be implemented by any suitable control device, such as one or more of the control devices discussed with reference to FIGS. 1-6. In addition, FIG. 7 depicts steps performed in a particular order for purposes of illustration and discussion. Those of ordinary skill in the art, using the disclosures provided herein, will understand that the steps of any of the methods disclosed herein can be modified, adapted, rearranged, omitted, and/or expanded in various ways without deviating from the scope of the present disclosure.

At (502), the method includes accessing data indicative of a plurality of grid service requests. For instance, the service categorization module 310 of FIG. 3 can receive signals 302 indicative of a plurality of grid service requests. Accessing the data indicative of the plurality of grid service requests can include receiving the data over a suitable communications medium or accessing the data stored, for instance, in one or more memory devices. The data indicative of the plurality of grid service requests can include data associated with a power demand for each of the grid service requests.

At (504), the grid service requests are categorized into a plurality of priority tiers, such as a primary tier, a secondary tier, and a tertiary tier. For instance, the service categorization module 310 of FIG. 3 can categorize the grid service requests into the plurality of priority tiers. Multiple grid service requests can be categorized in the same or common priority tier.

At (506), an aggregated power demand can be determined for each priority tier. For instance, the service categorization module 310 of FIG. 3 can determine an aggregated power demand for each priority tier. In examples wherein a single grid service request is categorized in a priority tier, the aggregate power demand for the priority tier can be equal to the power demand associated with the single grid service request. In examples where multiple grid service requests are categorized in a priority tier, the aggregate power demand for the priority tier can be determined by summing the power demands associated with each grid service request in the priority tier.

At (508), the method can include determining a state of charge reserve for one or more of the priority tiers. For instance, the SOC management module 320 can generate signals indicative of state of charge reserve based on a signal indicative of the current state of charge of the energy storage system. In example implementations, the state of charge reserve for a priority tier is determined by accessing a droop curve the priority tier, monitoring the current state of charge of the energy storage system, and determining the state of charge reserve based at least in part on the state of charge of the energy storage system and the droop curve.

At (510), the method can include determining a power delivery command based on one or more of the aggregated power demand for each priority tier, the state of charge reserve for one or more priority tiers, and the available capacity after allocation of power delivery for one or more grid services in higher priority tiers. For instance, the service aggregation module 330 of FIG. 3 can receive signals indicative of an aggregated power demand for each of a primary tier, secondary tier, and tertiary tier. The service aggregation module 330 can also receive signals indicative of state of charge reserve for the primary tier and the second tier. The service aggregation module 330 can generate a power delivery command 350 in accordance with the techniques discussed with reference to FIG. 6 such that such that one or more grid service requests in a higher priority tier are given preference over one or more grid service requests in a lower priority tier and such that one or more grid service requests categorized in a higher priority tier are not degraded by one or more grid service requests categorized in a lower priority tier.

At (512) of FIG. 7, the power delivery of the energy storage system is controlled based on the power delivery command. For instance, the controller 200 of FIGS. 1 and 2 can receive a signal indicative of the current state of power delivery of the energy storage system. The controller 200 can compare the signal to the power delivery command to determine an error signal. The error signal can be used to make adjustments to the power delivery (e.g. charging/discharging) of the energy storage system such that the energy storage system delivers power in accordance with the power delivery command.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling the delivery of a plurality of grid services with an energy storage system, the method comprising:

accessing, by one or more control devices, data indicative of a plurality of grid service requests for an energy storage system, the plurality of grid service requests being categorized into a plurality of priority tiers;

determining, by the one or more control devices, an aggregated power demand for each of the plurality of priority tiers;

determining, by the one or more control devices, a state of charge reserve for one or more of the plurality of priority tiers based at least in part on a current state of charge of the energy storage system and a droop curve specifying target charging settings and target discharging settings;

controlling, by the one or more control devices, power delivery of the energy storage system based at least in part on the aggregated power demand for each of the plurality of priority tiers and the state of charge reserve for one or more of the plurality of priority tiers such that one or more grid service requests in a higher priority tier are given preference over one or more grid service requests in a lower priority tier, wherein the droop curve is generated based on state of charge boundary limits determined for each tier of the plurality of priority tiers.

2. The method of claim 1, wherein controlling, by the one or more control devices, power delivery of the energy storage system comprises:

determining, by the one or more control devices, a power delivery command based at least in part on the aggregated power demand for each of the plurality of priority tiers;

controlling, by the one or more control devices, power delivery of the energy storage system based at least in part on the power delivery command.

3. The method of claim 1, wherein the plurality of priority tiers comprises a primary tier, a secondary tier, and a tertiary tier.

4. The method of claim 1, wherein at least two grid services are categorized within a common priority tier.

5. The method of claim 4, wherein the aggregated power demand for the common priority tier is determined based at least in part by summing a power demand for each of the at least two grid service requests categorized in the common priority tier.

6. The method of claim 1, wherein the power delivery of the energy storage system is controlled by the one or more control devices based at least in part on data indicative of an available capacity for delivery of the one or more grid service requests in the lower priority tier after allocation of power delivery for the one or more grid service requests in the higher priority tier.

7. The method of claim 1, wherein the droop curve is generated based at least in part on a discharge boundary limit and a charge boundary limit associated with the priority tier.

8. The method of claim 2, wherein the power delivery command is associated with a polarity, the polarity of the power delivery command specifying whether to charge or to discharge the energy storage system.

9. The method of claim 8, wherein the polarity of the power delivery command is determined based at least in part on the polarity associated with the aggregate power demand determined for each priority tier of the plurality of priority tiers.

10. The method of claim 9, wherein the polarity associated with the power delivery command specifies charging of the energy storage system when the polarity of the higher priority tier specifies charging of the energy storage system and the polarity of the lower priority tier specifies discharging of the energy storage system.

11. The method of claim 9, wherein the polarity associated with the power delivery command specifies discharging of the energy storage system when the polarity of the higher priority tier specifies discharging of the energy storage system and the polarity of the lower priority tier specifies charging of the energy storage system.

12. A control system for controlling an energy storage system, comprising:

a service categorization module implemented by one or more control devices, the service categorization module configured to categorize a plurality of grid service requests into a plurality of priority tiers, the service categorization module further configured to determine data indicative of an aggregated power demand for each of the priority tiers;

a state of charge management module implemented by the one or more control devices, the state of charge management module configured to determine a state of charge reserve for one or more of the plurality of priority tiers based at least in part on a current state of charge of the energy storage system and a droop curve specifying target charging settings and target discharging settings;

a service aggregation module implemented by the one or more control devices, the service categorization module configured to determine a power delivery command based at least in part on the data indicative of the aggregated power demand for each of the one or more priority tiers and the data indicative of the state of charge reserve for one or more of the plurality of priority tiers, wherein the droop curve is generated based on state of charge boundary limits determined for each tier of the plurality of priority tiers.

13. The control system of claim 12, wherein at least two grid service requests are categorized within a common priority tier.

14. The control system of claim 13, wherein the service categorization module is configured to determine data indicative of an aggregated power demand for the common priority tier based at least in part by summing a power demand for each of the at least two grid service requests categorized in the common priority tier.

15. The control system of claim 12, wherein the power delivery command is determined based at least in part on data indicative of an available capacity for delivery of the one or more grid service requests in the lower priority tier after allocation of power delivery for the one or more grid service requests in the higher priority tier.

16. The control system of claim 12, wherein the power delivery command has a polarity determined based at least in part on a polarity associated with each of the plurality of priority tiers, the polarity of the power delivering command specifying whether to charge or to discharge the energy storage system.

17. An energy storage system, comprising:

a plurality of energy storage devices configured to deliver power to a utility grid;

an interface for receiving a plurality of grid service requests;

a monitoring device configured to monitor a state of charge of the plurality of energy storage devices; and a control system configured to categorize the plurality of grid service requests into a plurality of priority tiers, the control system further configured to determine an aggregated power demand for each of the plurality of priority tiers and to determine a state of charge reserve for one or more of the plurality of priority tiers based on a current state of charge of the plurality of energy storage devices and a droop curve specifying target charging settings and target discharging settings, the control system further configured to control power delivery of the energy storage system based at least in part on the aggregated power demand for each of the priority tiers and the state of charge reserve for one or more of the plurality of priority tiers such that one or more grid service requests in a higher priority tier are given preference over one or more grid service requests in a lower priority tier, wherein the droop curve is generated based on state of charge boundary limits determined for each tier of the plurality of priority tiers.

18. The energy storage system of claim 17, wherein the control system is configured to control power delivery of the energy storage system based at least in part on the aggregated power demand for each of the priority tiers such that one or more grid service requests categorized in a higher priority tier are not degraded by one or more grid service requests categorized in a lower priority tier.

19. The energy storage system of claim 17, wherein at least two grid service requests are categorized in a common priority tier, the aggregated power demand for the common priority tier being determined at least in part by summing a power demand for each of the at least two grid service requests categorized in the common priority tier.

* * * * *